United States Patent
Leis et al.

(10) Patent No.: US 10,886,075 B2
(45) Date of Patent: Jan. 5, 2021

(54) INTEGRATED CARBON/CARBON ULTRACAPACITOR OF HIGH POWER DENSITY AND BATTERY COMPOSED FROM SAID CAPACITORS

(71) Applicant: OÜ Skeleton Technologies Group, Tallinn (EE)

(72) Inventors: Jaan Leis, Viimsi vald (EE); Ann Laheäär, Viimsi vald (EE); Priit Pihlakas, Viimsi vald (EE); Mati Arulepp, Viimsi vald (EE); Anti Perkson, Viimsi vald (EE); Taavi Madiberk, Viimsi vald (EE)

(73) Assignee: OÜ Skeleton Technologies Group, Tallinn (EE)

( * ) Notice: Subject to any disclaimer, the term of this patent is extended or adjusted under 35 U.S.C. 154(b) by 113 days.

(21) Appl. No.: 16/304,368

(22) PCT Filed: May 26, 2017

(86) PCT No.: PCT/EP2017/062787
§ 371 (c)(1),
(2) Date: Nov. 26, 2018

(87) PCT Pub. No.: WO2017/203040
PCT Pub. Date: Nov. 30, 2017

(65) Prior Publication Data
US 2019/0295784 A1    Sep. 26, 2019

Related U.S. Application Data

(60) Provisional application No. 62/341,657, filed on May 26, 2016.

(30) Foreign Application Priority Data

May 26, 2016    (GB) .................................. 1609299.1

(51) Int. Cl.
*H01G 11/74*    (2013.01)
*H01G 11/10*    (2013.01)
(Continued)

(52) U.S. Cl.
CPC ............. *H01G 11/74* (2013.01); *H01G 11/10* (2013.01); *H01G 11/78* (2013.01); *H01G 11/80* (2013.01);
(Continued)

(58) Field of Classification Search
CPC ........ H01G 11/74; H01G 11/10; H01G 11/78; H01G 11/80; H01G 11/82; H01G 11/86; H01G 11/32; Y02E 60/13
See application file for complete search history.

(56) References Cited

U.S. PATENT DOCUMENTS 6,534,212 B1    3/2003    Hooke
9,111,693 B2    8/2015    Madiberk et al.
(Continued)

FOREIGN PATENT DOCUMENTS

CN    202887989 U    4/2013
CN    204632594 U    9/2015
(Continued)

OTHER PUBLICATIONS

Intellectual Property Office, Search report of foreign application No. GB1609299.1, dated Oct. 31, 2016, 7 pages.

*Primary Examiner* — Dion Ferguson
(74) *Attorney, Agent, or Firm* — Berggren LLP

(57) ABSTRACT

The present invention relates to an electric double-layer capacitor and its manufacturing method. The ultracapacitor comprises a cylindrical housing having a bottom at one end and the housing is closed by an end cap integrated with first current terminal. From the bottom of the housing protrudes a terminal end of the second current terminal. Unlike to the (Continued)

previously known solutions the current terminals are arranged into the ultracapacitor, and spot welded to the electrode terminal to decrease internal resistance and to reach optimal packing density.

12 Claims, 9 Drawing Sheets

(51) Int. Cl.
    *H01G 11/80*     (2013.01)
    *H01G 11/86*     (2013.01)
    *H01G 11/78*     (2013.01)
    *H01G 11/82*     (2013.01)
    *H01G 11/32*     (2013.01)

(52) U.S. Cl.
    CPC ............ *H01G 11/82* (2013.01); *H01G 11/86* (2013.01); *H01G 11/32* (2013.01); *Y02E 60/13* (2013.01)

(56) References Cited

U.S. PATENT DOCUMENTS

| | | | |
|---|---|---|---|
| 10,262,809 B2 * | 4/2019 | Lee | H01G 11/82 |
| 2002/0093783 A1 | 7/2002 | Bendale et al. | |
| 2003/0086239 A1 * | 5/2003 | Bendale | H01G 11/78 |
| | | | 361/502 |
| 2006/0203429 A1 * | 9/2006 | Thrap | H01G 11/82 |
| | | | 361/502 |
| 2007/0026624 A1 * | 2/2007 | Fujino | H01G 11/34 |
| | | | 438/396 |
| 2008/0013253 A1 * | 1/2008 | Thrap | H01G 9/016 |
| | | | 361/502 |
| 2009/0180238 A1 | 7/2009 | Gallay et al. | |
| 2010/0227208 A1 * | 9/2010 | Kim | H01G 9/02 |
| | | | 429/94 |
| 2010/0227209 A1 * | 9/2010 | Kim | H01M 2/266 |
| | | | 429/94 |
| 2013/0155575 A1 * | 6/2013 | Mori | H01G 11/82 |
| | | | 361/500 |
| 2013/0286542 A1 * | 10/2013 | Madiberk | H01G 11/74 |
| | | | 361/502 |
| 2014/0293510 A1 * | 10/2014 | Miura | H01M 2/30 |
| | | | 361/502 |
| 2014/0308554 A1 * | 10/2014 | Khakhalev | H01M 4/0471 |
| | | | 429/94 |
| 2014/0377623 A1 * | 12/2014 | Pyzza | H01G 2/08 |
| | | | 429/120 |
| 2015/0279574 A1 * | 10/2015 | So | H01M 2/263 |
| | | | 361/502 |
| 2016/0343518 A1 * | 11/2016 | Sakurai | H01G 11/06 |
| 2016/0343997 A1 * | 11/2016 | Sekiya | H01M 10/0431 |
| 2017/0372848 A1 * | 12/2017 | Yoon | H01G 11/76 |

FOREIGN PATENT DOCUMENTS

| | | |
|---|---|---|
| EE | 05629 B1 | 4/2012 |
| EP | 1255310 A2 | 11/2002 |
| EP | 1279198 B1 | 1/2003 |
| JP | 2000260417 A | 9/2000 |
| KR | 20140007868 A | 1/2014 |
| WO | 03041097 A1 | 5/2003 |
| WO | 2012032407 A2 | 3/2012 |

* cited by examiner

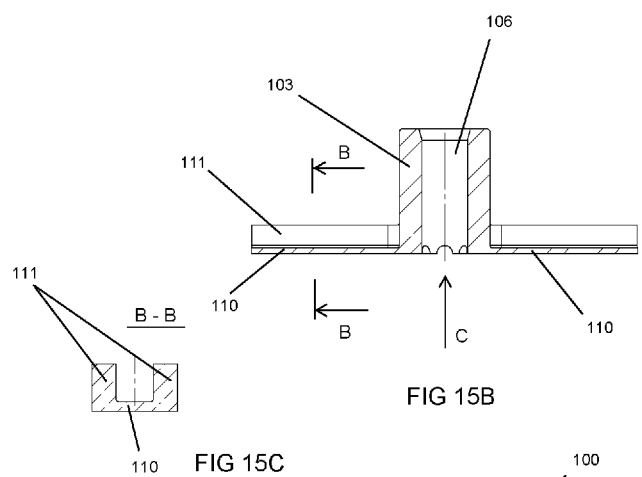
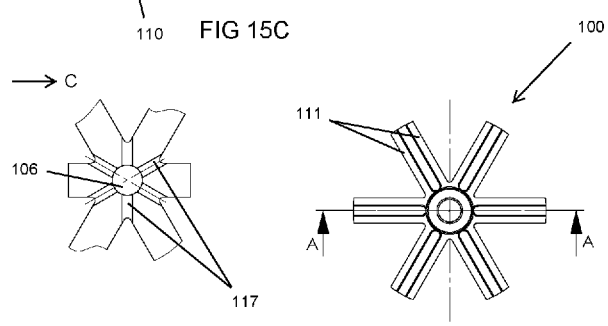
FIG 15B
FIG 15C
FIG 15D
FIG 15A

INTEGRATED CARBON/CARBON ULTRACAPACITOR OF HIGH POWER DENSITY AND BATTERY COMPOSED FROM SAID CAPACITORS

PRIORITY

This application is a U.S. national application of the international application number PCT/EP2017/062787 filed on May 26, 2017 and claiming priority of both EP national application 1609299.1 filed on May 26, 2016 and U.S. provisional application 62/341,657 filed on May 26, 2016 the contents of which are incorporated herein by reference.

TECHNICAL FIELD

The present invention is related to integrated electric double-layer ultracapacitor with carbon composite electrodes of high energy density having a cylindrical housing and to the battery composed from ultracapacitors.

BACKGROUND ART

From the prior art is known various construction of the double-layer capacitors. In document EE05629, 16 Apr. 2012, OÜ Skeleton Technologies the inventors of the present invention are describing a prismatic double-layer capacitor. Until now the main problem with cylindrical double-layer capacitors is the contact between the electrode and current terminal.

From documents WO03/041097, 15 May 2003, Maxwell Technologies, Inc. is described double-layer capacitor comprising a first terminal and second terminal, a rolled electrode structure placed into capacitor can. Thereafter the capacitor can is closed with contact edge and first stud/collector. The second disk/terminal post is placed to the other end of the capacitor can. The main problem of cylindrical capacitors is contact between the "jellyroll" electrode and current terminal.

US2009/0180238, 16 Jul. 2009, Maxwell Technologies, Inc., describes a double-layer energy storage device comprising a first current collector and a second current collector having opposite sides, a first and second electrode structure is disposed adjacent to opposing sides of corresponding current collectors.

DISCLOSURE OF INVENTION

The present invention describes carbon/carbon Electrical Double-Layer Capacitor (EDLC) of high specific capacity and energy density, which includes a negatively charged micro/mesoporous carbon composite electrode and a positively charged micro/mesoporous carbon composite electrode, separated from each other by a separator having porosity all through.

The invention describes also the structure of cylindrical-shape carbon/carbon EDLC of high specific capacity and energy density, which partially guarantees the efficient packing density and low internal resistance of the electrochemical system.

The invention describes in addition specialty of the cylindrical EDLC which enables without additional supporting elements to integrate individual elements of the EDLC into high-voltage EDLC battery.

The objective of the invention is to provide design of the cylindrical ultracapacitor of high power density having low internal resistance. Said objective has been achieved by integrating a first current terminal and end cap of the capacitor whereas the first current terminal comprising a stellate-like structure or star-like structure with feet or prongs or members extending radially from the centre of the current terminal and reinforcing ribs formed to one of the edges of the radially extending members. The current terminals are laser welded to the capacitor electrode along the bottom of the radially extending members. The capacitor comprises a housing having closed bottom with an opening through which protrudes out from the housing a terminal end of the second current terminal. Said design enables to have more compact and high power density ultracapacitor compared with the other ultracapacitors in prior art.

BRIEF DESCRIPTION OF DRAWINGS

The embodiments of the present invention are described in the following detailed description with references to figures in which:

FIG. 15A-15D are showing a different views of a integrated current terminal used in energy storage device such as ultracapacitor according to present invention, where FIG. 15A is a current terminal partial top view with a star-like structure having reinforcing ribs; FIG. 15B is a cross-sectional view of the current terminal along the line A-A in FIG. 15A, FIG. 15C is a cross-sectional view of the reinforcing rib of the current terminal along the line B-B in FIG. 15B and FIG. 15D is a bottom view of the current terminal 103 for illustrating channel for directing the electrolyte to the jelly-roll during the manufacturing process of the double layer capacitor.

BEST MODE FOR CARRYING OUT THE INVENTION

Figure 1:
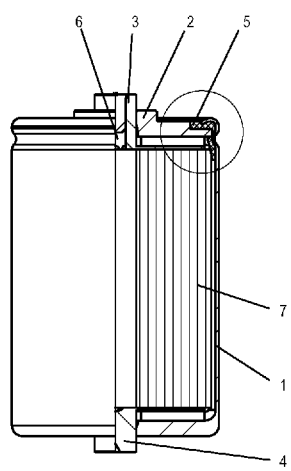
FIG. 1 shows a half-view half-cross-section view of the cylindrical ultracapacitor according to present invention.
Figure 2:
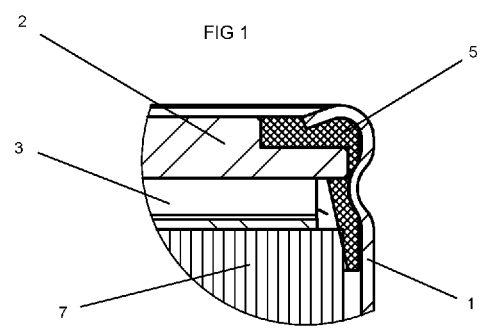
FIG. 2 shows an enlarged cross-section of the packing between ultracapacitor housing, capacitor end cap and carbon electrode pack.
Figure 3:
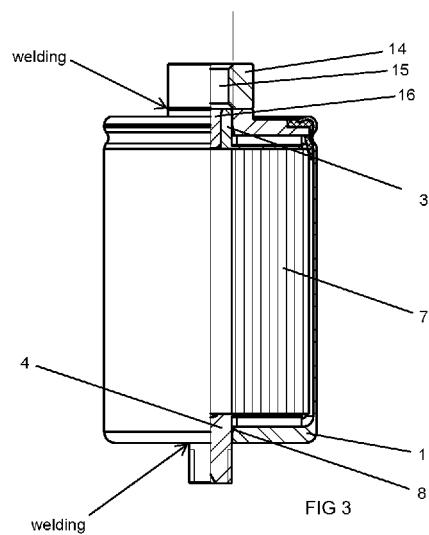
FIG. 3 shows an alternative embodiment of the cylindrical double-layer ultracapacitor according to the present invention.

An electric double layer capacitor according to the present invention comprises a cylindrical housing 1 closed at one end, the other end is closed by an end cap or lid 2, which is integrated with the first current terminal 3 (FIG. 1). The first current terminal 3 has a through hole 6 for filling capacitor with the electrolyte during the manufacturing process. The seal 5 is intended to isolate electrically the end cap 2 from the cylindrical housing 1. Into the cylindrical housing are arranged packed carbon/carbon electrodes 7. In the closed end (bottom) of the cylindrical housing 1 is opening/hole 8 through which protrudes a terminal end of the second current terminal 4 which is placed into the capacitor housing 1. The end of the second current terminal 4 is welded to the bottom of the housing 1 along the perimeter of the opening 8 (FIG. 3).

Figure 8:
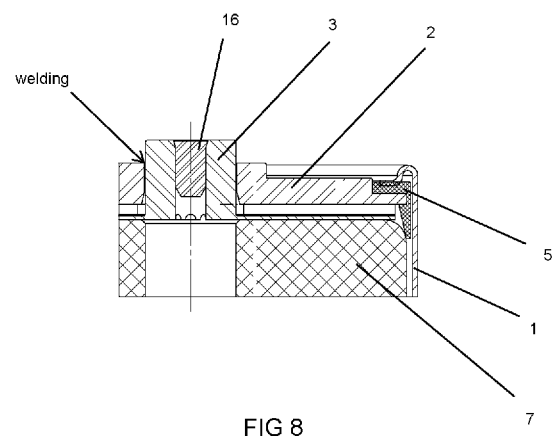
FIG. 8 shows a cross-sectional partial view of the end cap, first current terminal, capacitor housing, packed carbon electrode, seal and closing cap after filling the ultracapacitor with electrolyte.
Figure 9:
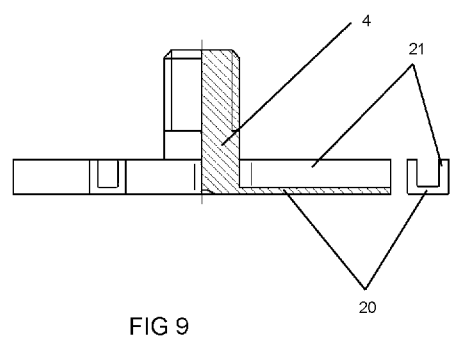
FIG. 9 shows a cross-sectional partial view of the second current terminal according to the invention.

The end cap 2 for closing the capacitor housing has an opening/hole 9 for guiding out a terminal end of the first current terminal 3 protruding from said capacitor, whereas the end cap 2 and the terminal end of the first current terminal 3 are welded together along the perimeter of the opening 9 (FIG. 8). The end cap 2 has in the outer edge a step 12, the height of which corresponding to the thickness of the seal 5, and the end cap 2 has around the opening 9 a cylindrical collar 13 extending above the plane of the end of the cylindrical housing and to which is attached a connecting sleeve 14 having external diameter which corresponds to the external diameter of the cylindrical collar 13. The connecting sleeve 14 has a threaded through hole 15, and said sleeve is welded to the collar 13 of the end cap 2.

Figure 4:
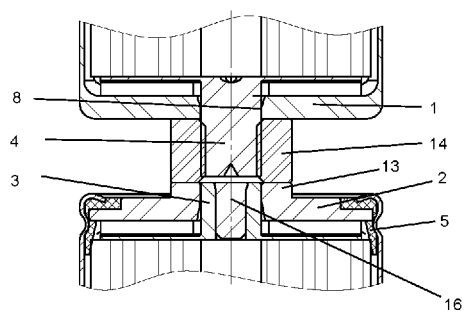
FIG. 4 shows a cross-section view from junction of adjacent ultracapacitors in the high-voltage battery block.

The terminal end of the second current terminal 4 is threaded, whereas the dimensions of the thread corresponds to the dimensions of the thread of the threaded hole 15 in the connecting sleeve 14 such that the individual electric double layer capacitors can be connected in series with a block of capacitors, i.e. the high-voltage battery is assembled (FIG. 4).

Figure 5A:
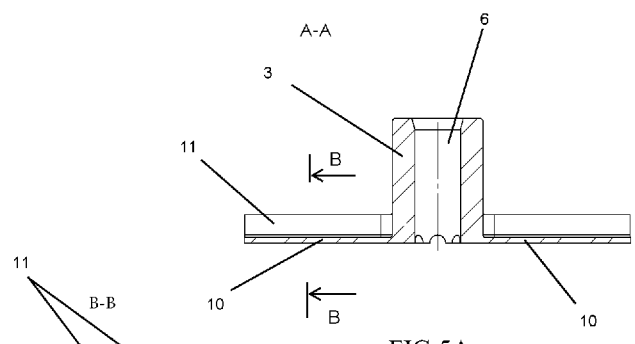
FIG. 5A-5D show a first current terminal cross-section view with a star-like structure having reinforcing ribs, cross-section of the radially extending members and ribs and channel in bottom side of the star-like structure.
Figure 5C:
Figures 5B, 5D:
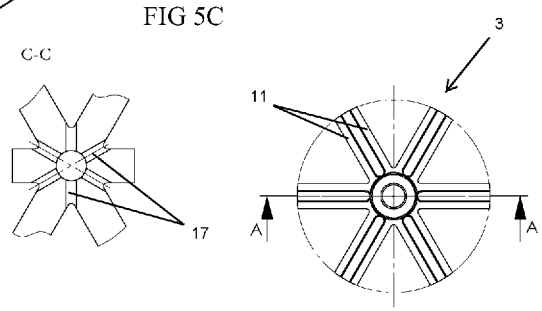
Figure 6:
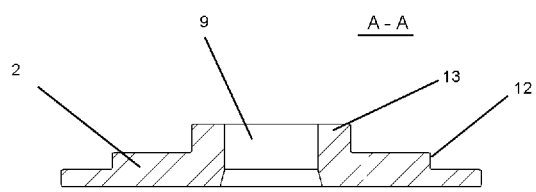
FIG. 6 and FIG. 7 show an end cap of the ultracapacitor for closing the cylindrical housing.
Figure 7:
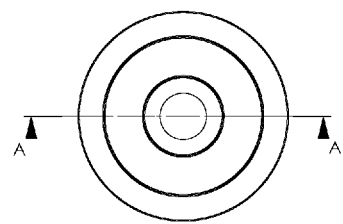
Figure 10:
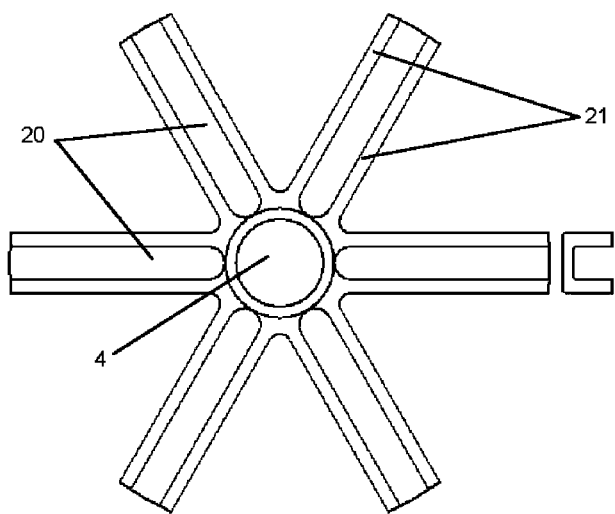
FIG. 10 shows a top view to the second current terminal shown in FIG. 9 to illustrate star-like structure having radially extending members from the centre of the current terminal.
Figure 11:
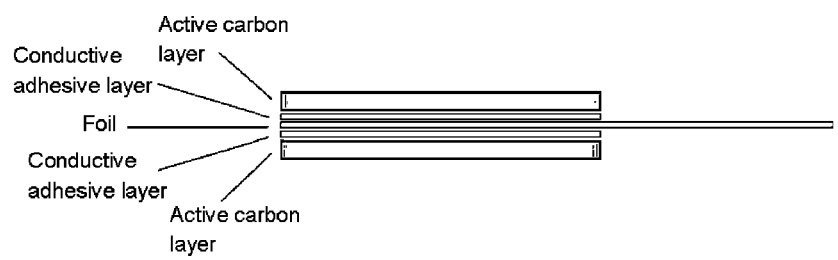
FIG. 11 shows a structure of the double-side coated carbon electrode.
Figure 12:
FIG. 12 shows a schematic view of the layers winded to the cylindrically shaped jelly-roll of electrode pairs.
Figure 13:
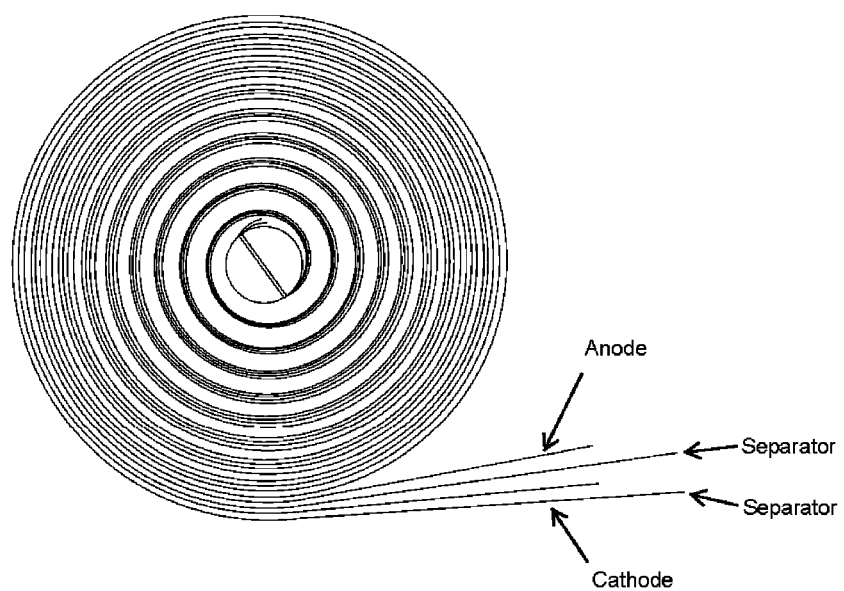
FIG. 13 shows a schematic view of the cylindrical jelly-roll placed into the capacitor manufactured according to the present invention.

The first current terminal 3 (FIG. 5A to 5B) comprising a star-like structure with the rectangular prongs 10 extending radially from the centre of the star-like structure (or radially extending members from the centre of current terminal) where to the upper side (one side) of the radially extending members 10 are formed reinforcing ribs 11 which are placed into contact with the bottom of the end cap 2 of the capacitor. In context of present invention the term star-like structure should be understood as detail comprising feet's or radially extending members or prongs protruding radially from the centre of the current terminal where said feet's or radially extending members or radially protruding prongs are connected to each other only at the centre of the current terminal (see FIG. 5B, 5D, 10).

The bottom side of the star-like structure radially extending members 10 of the current terminal 3 is laser-spot welded respectively to the flattened positive or negative ends of the jelly-roll of wound carbon electrodes 7 placed into the cylindrical housing 1 during assembling the double-layer capacitor. The rectangular radially extending members 10 with reinforcing ribs 11 are formed and arranged radially into upper side of the star-like structure of the current terminals 3. From the trough hole 6 of the first current terminal 3 are extending channels 17 between the radially extending members 10 of the star-like structure of the first current terminal 3. These channels 17 are directing during the manufacturing process of the capacitor the electrolyte to the jelly-roll 7 when the current terminal 3 is welded to electrode.

The second current terminal 4 comprising similarly a star-like structure with rectangular extending members 20 protruding radially from the centre of current terminal 4 where to the upper side of the prongs 20 of the star-like structure are formed the reinforcing ribs 21 that are placed into contact with the bottom of the cylindrical housing 1. The bottom side of the star-like structure radially extending members 10 of the second current terminal 4 is laser-spot welded respectively to the flattened negative or positive ends of the jelly-roll of wound carbon electrodes 7 placed into the cylindrical housing 1 during assembling the double-layer capacitor.

Figure 14:
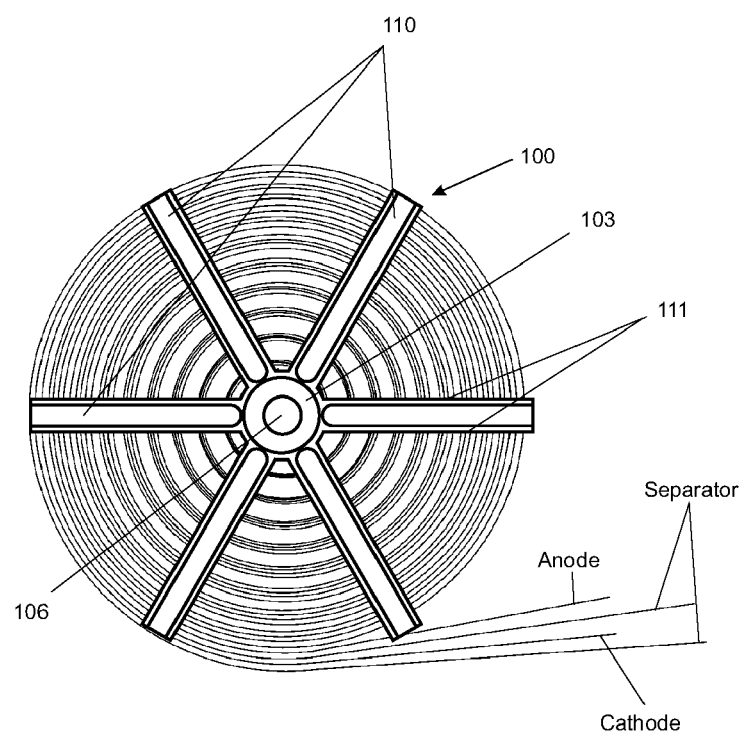
FIG. 14 shows a current terminal according to the present invention attached to the jelly-roll of the packed carbon/carbon electrode used in ultracapacitor of high power density.

In FIG. 14 and FIG. 15A-A5D are shown an integrated current terminal used in energy storage devices such as ultracapacitors of high power density or battery composed from said capacitors. Said integrated current terminal comprises a "star-like structure" (3) with rectangular extending members 110 extending radially from the centre of the current terminal 103 whereas to the edges of the upper side of the extending members 110 are formed reinforcing ribs 111.

The integrated current terminal 103 has a through hole 106 for filling for example double layer capacitor during the manufacturing process with the electrolyte. For distributing electrolyte evenly there are provided channels 117 in the bottom side of the current terminal, said channels are extending from the through hole 106 to contact point between the extending members 110 of the star-like structure 100.

These channels 117 are directing during the manufacturing process of the ultracapacitor the electrolyte to the jelly-roll when the current terminal is welded to electrode.

The bottom side of current terminal radially extending members 114 is welded to the flattened ends of the current collector foils bending over the plane of the cylindrical jelly-roll of wound electrodes. The laser welding or laser spot welding can be used for welding process.

The bottom side of the round base of the first and second current terminal have laser-spot welded respectively to positive and negative ends of the packed cylindrical carbon electrode 7 placed into the cylindrical housing 1 during assembling the double-layer capacitor. The reinforcing ribs 11, 21 are formed and arranged radially into upper side of the current terminals.

Advantages, which are provided by the "star-like current terminals" according to this invention, which is laser welded respectively to the flattened positive and negative ends of the current collector foils bending over the jelly-roll of packed carbon electrodes are following:
1. Low contact resistance between collector foils and current terminals
2. Saving in the weight compared to the common plate-like current terminals
3. Saves an extra space for the electrolyte during filling To isolate electrically the end cap 2 and packed carbon electrode 7 from the capacitor cylindrical housing 1 is used the seal 5 The seal 5 is ring with L-shaped cross-section where the shorter prong of the L-letter is supported to the step 12 in the outer edge of the end cap 2, and the longer prong of the L-letter is wrapped around cylindrically packed carbon electrode. The electrode is centered into housing and isolated from the housing in this way.

The electric double layer capacitor is prepared as follows: first of all, the second current terminal is placed into the cylindrical housing so that the reinforcement ribs in the upper side of the lamellar round base of the second current terminal are supported to the bottom of cylindrical housing and the terminal end of the second current terminal extends out from the housing. The terminal end of the second current terminal is welded on the outside to the bottom of the housing. The cylindrically packed carbon electrodes are placed into the housing and the cylindrical housing is closed with the end cap with seal so that the seal surrounds upper part of the carbon electrode (the electrode is isolated from the housing. Thereafter the upper edge of the cylindrical housing is rolled so that the capacitor is closed and sealed hermetically. The capacitor is filled through the hole 6 in the first current terminal with the electrolyte during the manufacturing process and thereafter the hole is closed with closing cap 16. The connecting sleeve 14 is welded to the terminal end of the first current terminal before or after filling the capacitor with electrolyte.

Example of the Manufacture of Glued Electrodes

For preparing a capacitor rechargeable positive electrode (anode) the 0.85 grams of titanium carbide (H.C. Starck) derived microporous synthetic primary carbon with irregular, non-graphite structure and 0.15 grams of silicon carbide (Sika-Tech) derived synthetic secondary carbon consisting of microporous graphene layers is mixed in 3 ml of ethanol. To the resulting mixture was added 8% of a polymeric binder (PTFE, Aldrich, 60% dispersion in water). After mixing, the resulting mixture was dried at 90° C. for approximately 1 hour at atmospheric pressure. Then the mixture was pressed into a 2-3 mm thick sheet and was formed using a rotary compactor gradually approximately 90 μm (micrometres) thick and approximately 50 mm wide carbon active layer film. Similarly was prepared a rechargeable negative electrode, wherein the primary carbon used was preferably with higher specific surface area. A carbon films were dried at 150° C. under vacuum. The dried carbon films were glued by using adhesion layer to the aluminium foil with 165 mm width (for example, C209, KDK Corporation, 20 mm). The used adhesion layer was previously prepared solution of 50% carbon black and 10% of PVDF (Aldrich) in NMP (N-methyl-2-pyrrolidone). Then the electrodes coated from one side with the active carbon layer where dried at 100° C., and the carbon films were glued to the opposite side of the aluminium strip of the opposite side of the carbon layer. Thereafter, the resulting double-side coated electrodes were dried at 130° C. for 48 h in vacuum.

The double sided electrodes with active carbon layer were cut to size so that the width of the carbon strip was 50 mm and the width of the foil protruding from the one edge was 60 mm.

To the working surface was placed 60 mm wide separator and a positively charged capacitor electrode was placed on separator so that the edges of the separator would exceed the active layer carbon film from each side equally. In the same way was placed to said electrode the second separator and onto top of that negatively charged electrode whose foil edge was on the opposite edge with previous electrode. To the one end of the electrode and separator tape was attached tube with 5 mm diameter and electrode and separator tape was wrapped around said tube. Said formed roll with external diameter 29 mm was fixed with tape and the 5 mm tube was removed. The protruding foil of the electrodes were formed flat and the terminal of the positive package was spot welded to the positive current terminal of the capacitor. Thereafter the cylindrical package was placed into capacitor housing and negative terminal of the package was spot welded to the negative current terminal of the capacitor. The first current terminal was pushed into housing and was sealed by corresponding seal and the housing was closed and rolled hermetically.

The electrical resistance of closed capacitor was checked with Ohm meter and gas-tightness by gas He approximately with 5 atm pressure (506,625 kPa). After control the capacitor was connected to the vacuum system (approximately 7 mm/Hg), and left at 120° C. for 72 hours.

After removing all air the capacitor was filled with the previously prepared solution of anhydrous electrolyte consisting of acetonitrile (Aldrich) and 30% triethylmethyl ammonium tetrafluoroborate (Stella Chemical).

The following table shows the examples of the nanoporous electrode pairs used in present invention, which obviously will not restrict use of the present invention having different configuration of the carbon.

TABLE 1

| No, SC* | Anode (+) | Cathode (−) | Weight ration+/− | Capacitance of the carbon electrodes F/g | Capacitance of the carbon electrodes F/cm³ | 5-s power, (W/cm³) of carbon |
|---|---|---|---|---|---|---|
| 1479 | CDC1 | CDC1 | 0.909 | 29.1 | 21.8 | 9.37 |
| 1487 | CDC2 | CDC2 | 0.998 | 28.6 | 20.9 | 6.1 |
| 1464 | CDC3 | CDC2 | 0.973 | 28.9 | 21.9 | 9.38 |
| 1462 | CDC3 | CDC1 | 0.931 | 28.3 | 21.5 | 9.18 |
| 1481 | CDC4 | CDC1 | 0.975 | 27.0 | 21.6 | 9.0 |

*carbon electrodes glued to the collector, except for 1487, where pressure contact of the carbon electrode is for foil covered with carbon layer According to the present invention, a layer of activated carbon is connected to both surfaces of the current terminal, wherein the connecting methods may be: pressure contact of a carbon film to the surface of the current collector; gluing a carbon film to surface of the collector; compacting a dry mixture or paste of carbon and the binder to the current collector. The current collectors may be any electro-chemically resistant material with a very good electrical conductivity—typically a thin metal foil, for instance Al-foil 5-100 mkm thickness, which in turn may be coated with a thin (e.g. thickness 1-2 mkm) ceramic or any other electrically conductive layer for improving the electrical contact between the active carbon and current collector. Alternatively, a method for improving electrical contact may be coating an activated carbon film with a thin layer of metal using a vacuum deposition method such as thermal or plasma vacuum deposition PVD method (Physical Vapour Deposition) or a metal spraying method.

Possible method for connecting current collectors and terminal are spot welding; TIG welding; laser welding; diffusion welding; Al sputtering.

Aprotic electrolyte may comprise an organic solvent and aprotic salt being donor for ion pairs. The electrolyte salts may be quaternary ammonium salts, quaternary phosphonium salts, and, for example, tetraethyl ammonium tetrafluoroborate; triethylmethylammonium tetrafluoroborate, etc.

The electrolyte salt of the cation may be $(R_1R_2)_4N^+$ or $R_1R_2P^+$ where $R_1$ and $R_2$ are alkyl groups of up to —$CH_3$ to —$C_5H_{11}$ or cyclic phenyl ring —$C_6H$ 5, and anion $BF_{4-}$; $PF_6-$; $AsF_{6-}$; $Ph_4B^-$; $CF_3SO_3-$ or others.

Solvents used is selected from the following solvents and their mixtures: acetonitrile, benzonitrile, sulfolane, propylene carbonate, ethylene carbonate, ethylmethylcarbonate, dimethyl carbonate, diethyl carbonate, methyl acetate, γ-butyrolactone, tetrahydrofuran, N, N-dimethylformamide, dimethyl sulfoxide, pyridine, sulfolane, dimethyl ketone, and the like. Electrolytes, ionic liquids can be used as an imidazole moiety, for example, EMIBF6, EMICF3SO3 et al. concentrated or with solvents.

LIST OF ELEMENTS

1—Cylindrical housing
2—End cap or lid
3—First current terminal
4—Second current terminal
5—Seal
6—Through hole
7—Carbon electrodes
8—Opening
9—Hole
10—Rectangular prong
11—Reinforcing rib
12—Step
13—Cylindrical collar
14—Connecting sleeve
15—Threaded through hole
16—Closing cap
17—Channel
20—Rectangular prongs
21—Reinforcing rib
100—Star-like structure
103—Current terminal
106—Through hole
110—Radially extending members
111—Reinforcing ribs
117—Channels

The invention claimed is:

1. An integrated carbon/carbon ultracapacitor of high energy density comprising:
  a cylindrical housing having a bottom, and the housing being closed in the opposite end by an end cap, which is integrated with a first current terminal having a through hole for filling ultracapacitor with an electrolyte,
  a seal for isolating electrically the end cap from the cylindrical housing of the ultracapacitor,
  a double-layer carbon electrode placed into the cylindrical housing, and
  a second current terminal,
  wherein the bottom of the cylindrical housing is an opening through which protrudes out from the cylindrical housing a terminal end of the second current terminal which is welded to the bottom of the housing along a perimeter of the opening outside of the housing, and
  the end cap has an opening for guiding out a terminal end of the first current terminal protruding from the capacitor, and the end cap and the terminal end of the first current terminal is welded together along the perimeter of the opening of the end cap, and
  wherein the first and the second current terminal comprise a star-like structure with rectangular extending members extending radially from a centre of the current terminal, and wherein reinforcing ribs are formed to an upper surface of the radially extending members of the star-like structure, and a lower surface of the star-like structure is welded correspondingly to positive or negative end of packed cylindrical carbon electrode during assembling the ultracapacitor.

2. The ultracapacitor according to claim 1, wherein the reinforcing ribs formed onto the upper surface of the radially extending members of star-like structure are radially oriented.

3. The ultracapacitor according to claim 1, wherein the end cap has on its outer edge a step with a height corresponding to a thickness of the seal, and the end cap has around the opening a collar extending above the plane of the end of the cylindrical housing, and a connecting sleeve which outside diameter corresponds to diameter of the collar is attached to said collar.

4. The ultracapacitor according to claim 3, wherein the connecting sleeve has a threaded through-hole and is welded to the collar of the end cap.

5. The ultracapacitor according to claim 3, wherein the end of the second current terminal is threaded, and wherein the dimensions of the said thread are corresponding to dimensions of the threaded through-hole of the connecting sleeve in such a way that individual electric double-layer ultracapacitors can be assembled in series into a capacitors battery.

6. The ultracapacitor according to claim 1, wherein the seal is a ring with L-shaped cross-section which is supported with shorter prong of the L-shaped cross-sectional form to the step in the outer edge of the end cap and longer prong of the L-shaped cross-sectional form is wrapped around cylindrically packed carbon electrode for centring carbon electrode into cylindrical housing and for isolating carbon electrode from the housing.

7. An integrated current terminal for energy storage device comprising a star-like structure with rectangular extending members extending radially from a centre of the current terminal wherein reinforcing ribs are formed onto edges of an upper side of the extending members.

8. The integrated current terminal according to claim 7 wherein the current terminal has a through hole for filling an energy storage device such as a double layer capacitor during manufacturing process with an electrolyte.

9. The integrated current terminal according to claim 8 wherein in bottom side of the current terminal from the through hole are extending channels to contact point of the extending members between the radially extending members of the star-like structure.

10. The integrated current terminal according to claim 7, wherein bottom side of current terminal radially extending members are welded to flattened ends of current collector foils bending over the plane of a cylindrical jelly-roll of wound electrodes.

11. The integrated current terminal according to claim 10 wherein the welding is laser welding or laser-spot welding.

12. A method for manufacturing an ultracapacitor with electric double-layer electrode, the method comprises the steps of
  a. placing into a cylindrical housing of the ultracapacitor a second current terminal so that reinforcement ribs formed on an upper side of a star-like structure are attached to a bottom of the housing and a terminal end of the current terminal is protruding out of the housing,
  b. welding terminal end of a second current terminal to the bottom of the cylindrical housing;
  c. placing a cylindrically packed carbon electrode into the housing; thereafter
  d. assembling an end cap with a seal so that the seal surrounds upper part of the carbon electrode;
  e. rolling an upper edge of the cylindrical housing inwards, so that the ultracapacitor is closed and sealed hermetically, f. ultracapacitor is filled through a hole in the first current terminal with an electrolyte and said hole is closed by a cap;
g. a connecting sleeve is welded to the first current terminal.

\* \* \* \* \*